US012621088B2

(12) United States Patent
Yoon et al.

(10) Patent No.: US 12,621,088 B2
(45) Date of Patent: May 5, 2026

(54) METHOD AND APPARATUS FOR TRANSMITTING OBJECTS BASED ON DEADLINE-AWARE

(71) Applicant: ELECTRONICS AND TELECOMMUNICATIONS RESEARCH INSTITUTE, Daejeon (KR)

(72) Inventors: Ho Sun Yoon, Daejeon (KR); Tae Yeon Kim, Daejeon (KR); Seong Moon, Daejeon (KR); Seung Woo Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 361 days.

(21) Appl. No.: 18/221,948

(22) Filed: Jul. 14, 2023

(65) Prior Publication Data

US 2024/0154735 A1     May 9, 2024

(30) Foreign Application Priority Data

Nov. 7, 2022     (KR) ........................ 10-2022-0146710

(51) Int. Cl.
*H04L 1/1867*          (2023.01)
*H04L 1/1829*          (2023.01)
(52) U.S. Cl.
CPC ............ *H04L 1/188* (2013.01); *H04L 1/1864* (2013.01)
(58) Field of Classification Search
CPC ..... H04L 1/188; H04L 1/1864; H04L 1/1854; H04L 1/1848; H04L 1/1642; H04L 1/1861; H04L 43/0852
See application file for complete search history.

(56) References Cited

U.S. PATENT DOCUMENTS 5,680,461 A      10/1997  McManis
2002/0124096 A1   9/2002  Loguinov et al.
(Continued)

FOREIGN PATENT DOCUMENTS

JP      1997-270788 A     10/1997
JP      2004-537218 A     12/2004
(Continued)

OTHER PUBLICATIONS

Hang Shi et al., "DTP: Deadline-aware Transport Protocol", APNet '19, Aug. 17-18, 2019, Beijing, China.
(Continued)

*Primary Examiner* — Yaotang Wang
(74) *Attorney, Agent, or Firm* — LRK PATENT LAW FIRM

(57)          ABSTRACT

Disclosed is a method and apparatus for transmitting an object which includes packets and is significant for an application of a receiver, the method including calculating a network latency between a sender and a receiver through a control message for transmitting a plurality of packets constituting the object, detecting that a specific packet is lost among the plurality of packets, calculating a retransmission required time required for retransmitting the specific packet, comparing the retransmission required time with a deadline, and transmitting a NACK message including information related to retransmission of the specific packet to the sender when the retransmission required time is within the deadline, wherein the network latency is used for calculating the deadline determined by latency times for transmission of the object.

14 Claims, 8 Drawing Sheets

(56)                    References Cited

U.S. PATENT DOCUMENTS

| | | |
|---|---|---|
| 2003/0023746 A1 | 1/2003 | Loguinov |
| 2007/0079222 A1* | 4/2007 | Kure ..................... H04L 1/1877 |
| | | 714/776 |
| 2015/0271225 A1 | 9/2015 | Mao et al. |
| 2016/0164943 A1 | 6/2016 | Walker et al. |
| 2022/0338204 A1* | 10/2022 | Jung .................... H04W 92/18 |

FOREIGN PATENT DOCUMENTS

| | | |
|---|---|---|
| KR | 10-2002-0087940 A | 11/2002 |
| WO | 2017/144643 A1 | 8/2017 |

OTHER PUBLICATIONS

M.P. Sharabayko et al., "The SRT Protocol draft-sharabayko-srt-01", Network Working Group, Internet-Draft, Sep. 2021.

* cited by examiner

METHOD AND APPARATUS FOR TRANSMITTING OBJECTS BASED ON DEADLINE-AWARE

CROSS-REFERENCE TO RELATED APPLICATION

This application claims priority to Korean Patent Application No. 10-2022-0146710, filed on Nov. 7, 2022, with the Korean Intellectual Property Office (KIPO), the entire contents of which are hereby incorporated by reference.

BACKGROUND

1. Technical Field

The present disclosure relates to a technology for transmitting data in object units composed of one or more packets meaningful in an application, and more particularly, to an object transmission method and apparatus for transmitting or discarding corresponding data based on deadline-aware by calculating whether a specific object can be retransmitted within a deadline which is determined according to a communication environment when a packet included in the specific object is lost.

2. Description of Related Art

Transmission control protocol (TCP) which is one of the existing transmission protocols, uses a retransmission method to reliably transmit packets to a receiver side. However, simply retransmitting all lost packets until a timeout occurs may have negative influences on both an application and a network. Accordingly, active research is being carried out on methods of selectively performing retransmission.

With the increase in media data such as video and audio data, the necessity of exchanging data in object units, which include one or more packets and are significant for an application, is increasing. For example, one image screen may be an object significant for an application, and the object may include one or more packets. A receiving application may output one image only after receiving all packets constituting an object, and when all the packets are not received, the corresponding object cannot be used.

Also, in real-time services, such as a video conference service, a metaverse service, a game service, and the like, it is necessary to transmit data to a receiver within a certain time period. For example, in the case of outputting a video stream on a screen of a receiving person in real time, an object which arrives too late is not output on the screen. In other words, it is necessary not only to simply transmit an object to a receiver side but also to ensure that all packets constituting the object arrive at the receiver side within a certain time. When all the packets constituting the object do not arrive at the receiver side within the certain time, the object is discarded.

Transmission protocols, such as TCP, Quick User Datagram Protocol (UDP) Internet Connections (QUIC), and the like, use a retransmission mechanism to recover from a packet loss. According to the existing retransmission method, when a packet loss occurs, the corresponding data is simply retransmitted during a timeout period until a receiver side receives the data. This method of simply retransmitting all packets has problems in supporting a real-time service as well as its performance.

SUMMARY

Accordingly, example embodiments of the present disclosure are provided to substantially obviate one or more problems due to limitations and disadvantages of the related art.

An object of the present disclosure is to provide a method and apparatus for transmitting objects, which calculates whether an object can be transmitted or retransmitted to a receiver within a deadline determined according to a communication environment, and processes the object which refers to data composed of one or more packets and is meaningful to an application.

Another object of the present disclosure is to provide a method and apparatus for transmitting objects, which calculates whether an object can be transmitted or retransmitted from a sender within a deadline determined according to a communication environment, and requests to the sender for a transmission procedure or a retransmission procedure for the object which is meaningful to an application and consists of one or more packets.

According to a first exemplary embodiment of the present disclosure, a method for transmitting an object (hereafter refer to 'object transmission method') may comprise: calculating a network latency between a sender and a receiver through a control message for transmitting a plurality of packets constituting the object, wherein the network latency is used for calculating a deadline determined for a transmission delay of the object; detecting that a specific packet is lost among the plurality of packets; calculating a retransmission required time required for retransmitting the specific packet; comparing the retransmission required time with the deadline; and transmitting a negative-acknowledgment (NACK) message including information related to retransmission of the specific packet to the sender when the retransmission required time is within the deadline.

The object transmission method may further comprise recalculating, by the sender, the retransmission required time required for retransmitting the specific packet on the basis of a time period calculated by subtracting a time point at which a first packet of the object is transmitted from a time point at which the NACK message arrives.

The object transmission method may further comprise, when the recalculated retransmission required time is within the deadline, receiving the specific packet from the sender.

The object transmission method may further comprise determining, by the sender, whether the NACK message is received before or after a last packet of the object is transmitted, wherein, when the NACK message is received after the last packet of the object is transmitted to the receiver, the recalculating of the retransmission required time comprises additionally adding a time period calculated by subtracting a time point at which the last packet is transmitted from the time point at which the NACK message is received to the retransmission required time.

Each data packet structure of the plurality of packets may include a partition field which has a partition value indicating whether a corresponding packet is a first part, an intermediate part, or a last part of the object or whether the corresponding packet is the object.

Each data packet structure of the plurality of packets may further include a remaining packet counter field which indicates the number of packets remaining after a currently transmitted packet among the plurality of packets of the object.

The object transmission method may further comprise sharing, by the receiver and the sender, information on a sending rate or a bandwidth and information on a bounded latency through a control message.

The object transmission method may further comprise calculating the deadline by adding an object sending latency required for transmitting the plurality of packets, a bounded latency, and the network latency.

When the retransmission required time is within the deadline, a retransmission latency may be smaller than the bounded latency.

The object transmission method may further comprise: calculating, by the sender, a first network latency occurring when the sender transmits a packet to the receiver; and calculating, by the sender, a second network latency occurring when the receiver transmits a packet to the sender.

According to a second exemplary embodiment of the present disclosure, an object transmission method may comprise: transmitting a plurality of packets constituting an object to a receiver; calculating a network latency between a sender and the receiver through a control message for transmitting the plurality of packets, wherein the network latency is used for calculating a deadline determined for a transmission delay of the object; receiving a negative-acknowledgment (NACK) message from the receiver detecting that a specific packet is lost among the plurality of packets; calculating a retransmission required time required for retransmitting the specific packet on the basis of a time period calculated by subtracting a time point at which a first packet of the object is transmitted from a time point at which the NACK message arrives; and retransmitting the specific packet to the sender when the calculated retransmission required time is within the deadline.

The object transmission method may further comprise calculating the deadline by adding an object sending latency required for transmitting the plurality of packets, a bounded latency, and the network latency.

When the retransmission required time is within the deadline, a retransmission latency may be smaller than the bounded latency.

The object transmission method may further comprise determining whether the NACK message is received before or after a last packet of the object is transmitted, wherein, when the NACK message is received after the last packet of the object is transmitted to the receiver, the calculating of the retransmission required time comprises additionally adding a time period calculated by subtracting a time point at which the last packet is transmitted from the time point at which the NACK message is received to the retransmission required time.

Each data packet structure of the plurality of packets may include a partition field which has a partition value indicating whether a corresponding packet is a first part, an intermediate part, or a last part of the object or whether the corresponding packet is the object.

Each data packet structure of the plurality of packets may further include a remaining packet counter field which indicates the number of packets remaining after a currently transmitted packet among the plurality of packets of the object.

The receiver may calculate a retransmission required time required for retransmitting the specific packet, comparing the retransmission required time with a precalculated deadline, and transmitting a NACK message including information related to retransmission of the specific packet to the sender when the retransmission required time is within the deadline.

According to a third exemplary embodiment of the present disclosure, an object transmission apparatus for transmitting or receiving an object which is used in an application and includes packets may comprise: an application which is an application program transmitting or receiving data and including a transmission protocol; an application programming interface (API) configured to support communication between the application and an external module; an object handler configured to convert data from the application into an object including one or more packets; a deadline handler configured to synchronize time between a sender side and a receiver side, calculate a deadline, and determine whether or not to proceed with transmission or retransmission of the packet; and an object sender configured to transmit the packets at a predetermined sending rate.

A data packet structure of the packets may include a partition field and a remaining packet counter field, wherein the partition field has a partition value indicating whether a corresponding packet is a first part, an intermediate part, or a last part of the object or whether the corresponding packet is the object, and the remaining packet counter field indicates the number of packets remaining after a currently transmitted packet among the plurality of packets of the object.

The object transmission apparatus may further comprise an object receiver configured to receive packets through a network, wherein the object handler converts the packets received from the object receiver into an object that may be transmitted to the application.

According to the present disclosure, the concept of a deadline for a latency is employed. In the case of processing data in object units, each node calculates a deadline according to a calculation method defined for the deadline, and it is determined whether transmission, retransmission, reception, or re-reception of a data packet of an object is possible on the basis of the deadline. According to the determination, it is possible to perform or cancel transmission or retransmission of the data packet. Accordingly, waste of resources of transmission and reception devices and a network can be minimized. Also, a calculated deadline can be widely applied to various data processing fields such as data processing, scheduling, retransmission, and the like.

Further, in order to calculate a deadline, it is necessary to synchronize time between two nodes and measure a network latency between the two nodes. Accordingly, the present disclosure may include a procedure for synchronizing time between two nodes and also a procedure for measuring a network latency in each direction during the time synchronization process. Through these procedures, the present disclosure can be effectively used in various fields involving time synchronization such as the field of transmission protocols and the like.

In addition, according to the present disclosure, it is possible to provide an object retransmission technology to which the concept of a deadline is applied. In other words, an existing method of simply retransmitting a packet until a receiver side receives the packet is inappropriate for real-time services and increases network load in network congestion. Meanwhile, as an appropriate transmission and retransmission method for real-time services, the present disclosure makes it possible to calculate a deadline for a time required to transmit or retransmit an object in a communication environment, predict whether it is possible to transmit or receive the object normally, selectively process transmission, retransmission, or cancel of transmission of a packet constituting the object with high reliability on the basis of the prediction, and reduce waste of resources of transmission and reception devices and a network. A configuration of the present disclosure can be effectively used in various fields related to various selective retransmission methods.

DETAILED DESCRIPTION OF THE EMBODIMENTS

Figure 1:
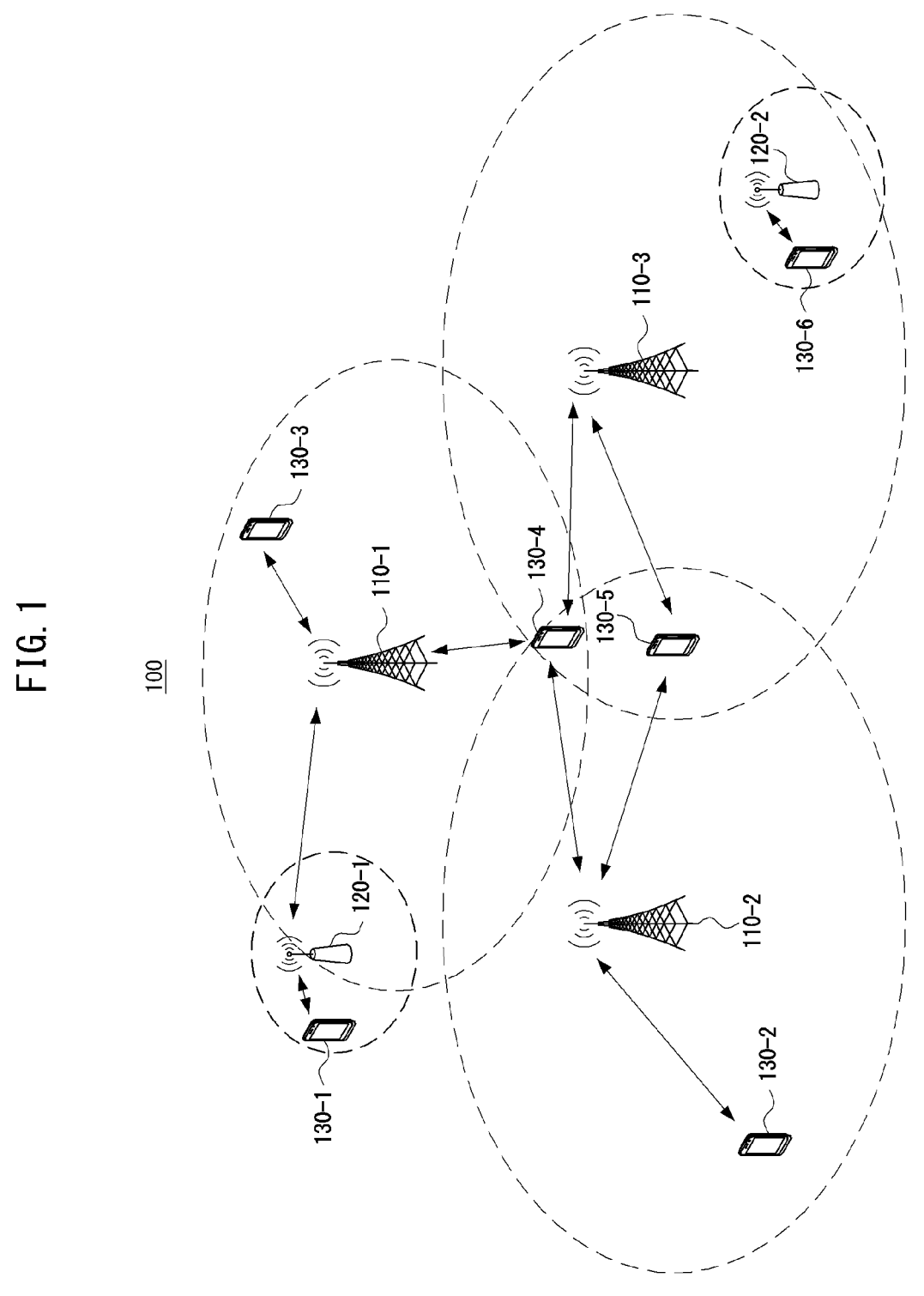
FIG. 1 is a conceptual diagram illustrating an exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have at least one of the structures or architectures as described below.

Figure 2:
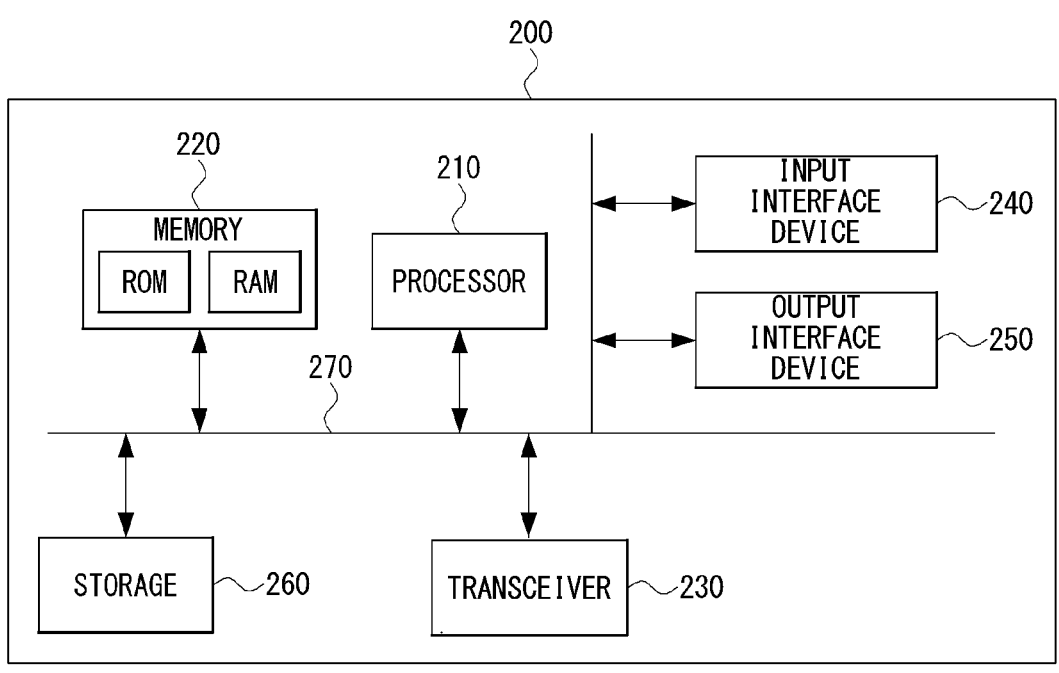
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, in the present exemplary embodiments, the base station (or cell) may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like. In addition, the base station (or cell) may be a CU node and/or a DU node to which functional split is applied.

In addition, in the present exemplary embodiments, the terminal may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Figure 3:
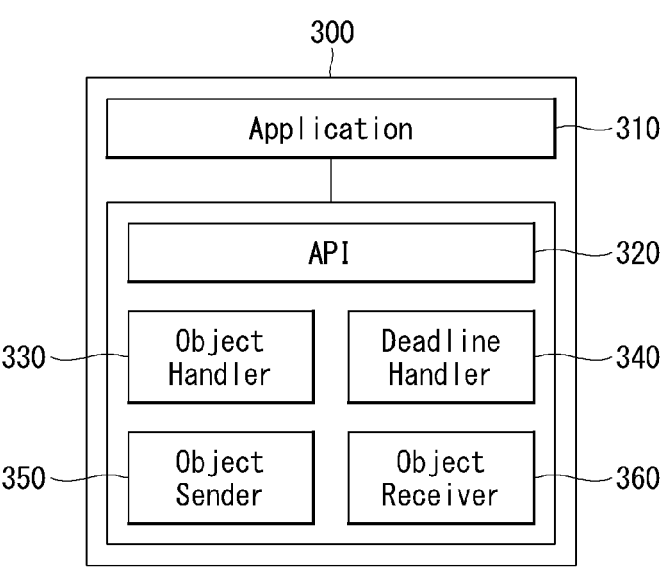
FIG. 3 is a block diagram of an architecture for an object transmission apparatus based on deadline recognition according to an example embodiment of the present disclosure.

FIG. 3 is a block diagram of an architecture for an object transmission apparatus based on deadline recognition according to an example embodiment of the present disclosure.

Referring to FIG. 3, an object transmission apparatus 300 may include an application 310, an application programming interface (API) 320, an object handler 330, a deadline handler 340, an object sender 350, and an object receiver 360.

The application 310 is an application program that transmits and receives data and may not only have a general meaning of providing a service but may also refer to software, such as a transmission protocol, that uses an object processing module proposed in the present embodiment.

The API 320 is an interface for application programs disclosed to the application 310. The API 320 may connect the application 310 and an external module to each other or support signal or message transmission and reception therebetween according to a preset procedure or protocol so that the application 310 and the external module communicate with each other.

The object handler 330 is a module for processing objects. When data transmitted by the application 310 is received, the object handler 330 converts the data into an object including one or more packets. Also, the object handler 330 performs a function of transforming packets received from the object receiver 360 into an object that may be transmitted to the application 310.

The deadline handler 340 synchronizes time between two nodes, calculates a deadline, and determines whether it is possible to transmit or retransmit a packet.

The object sender 350 transmits the packet according to a certain sending rate.

The object receiver 360 receives the packet and may perform a retransmission procedure as necessary.

The API 320, the object handler 330, the deadline handler 340, the object sender 350, and the object receiver 360 may be integrated together in an object processing module but are not limited thereto.

Meanwhile, the object transmission apparatus 300 may have the same configuration as an object reception apparatus. Also, the object transmission apparatus 300 or the object reception apparatus may be referred to as an object transceiver apparatus.

Figure 4:
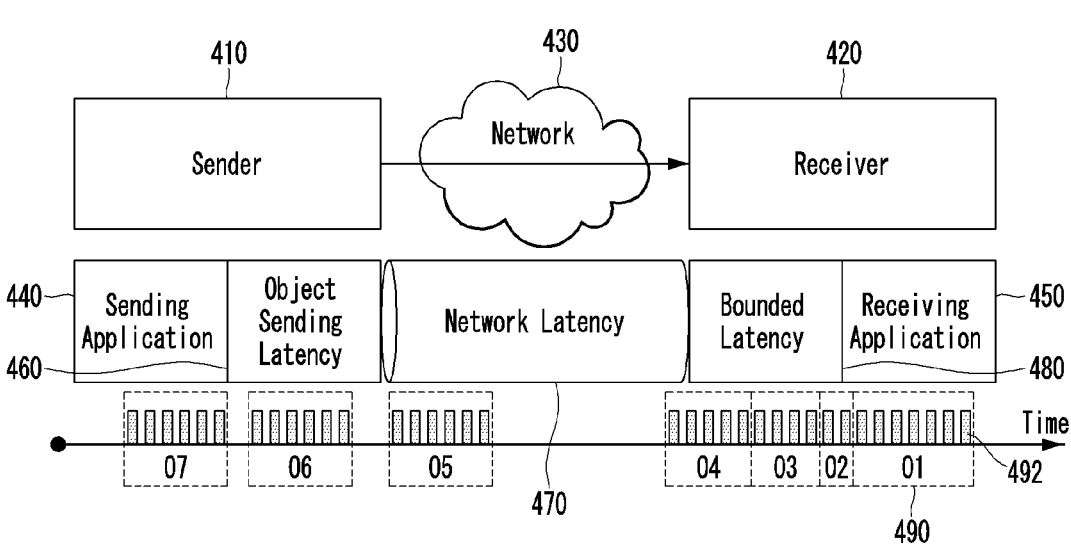
FIG. 4 is an example diagram illustrating a latency required for transmitting an object from a sender side to a receiver side.

FIG. 4 is an example diagram illustrating a latency required for transmitting an object from a sender side to a receiver side.

Referring to FIG. 4, a sender 410 may calculate a time required for transmitting objects 490 to a receiver 420 through a network 430, that is, a required latency. The objects 490 may include one or more packets 492. When there is an error in the received objects 490, the receiver 420 may calculate a latency required for requesting retransmission of the objects 490. A receiving application 450 processes the objects 490 only when all the packets constituting the objects 490 are received. When all the packets are not received, the receiving application 450 discards the objects 490.

The sender 410 may correspond to an object transmission apparatus on a sender side that transmits an object, and the receiver 420 may correspond to an object reception apparatus on a receiver side that receives the object.

In other words, there are an object sending latency 460 and a bounded latency 480 which are latencies at nodes and a network latency 470 which is a latency in the network 430 between an object sending operation of an application 440 which transmits an object at the sender 410 (hereinafter "sending application") and an object receiving operation of an application 450 which receives an object at the receiver 420 (hereinafter "receiving application").

Here, the object sending latency 460 represents a latency required for transmitting an object. For example, in the case of transmitting a 10 Mbit object at a sending rate of 1 gigabit per second (Gbps), a latency of 10 ms is required for transmitting the entire object to the network 430, and the value becomes the object sending latency 460.

The network latency 470 represents a time required for an object to pass through the network 430.

The bounded latency 480 represents a time for a receiving buffer to wait before transmitting the object 490 to the receiving application 450 of the receiver 420. When the bounded latency 480 is set to a large value, the object 490 is highly likely to be transmitted to the receiving application 450 by performing a retransmission or forward error correction (FEC) procedure for recovering a lost object. However, when the bounded latency 480 is set to a large value, a latency in which a received object is transmitted to the receiving application 450 increases, which is not appropriate for applications having a real-time characteristic. In other words, it is necessary to determine the bounded latency 480 in consideration of characteristics of the receiving application 450, a network condition, and the like.

For example, as shown in FIG. 4, "01" to "07" represent seven objects 490, and the object "01" has already been transmitted to the receiving application 450. The object "03" including four packets is waiting to be transmitted to the receiving application 450, and five packets included in the object "04" are being received by the receiver 420. The object "07" includes six packets and is waiting to be transmitted from the sending application 440 of the sender 410 to the receiver 420. A time required for transmitting the object "07" from the sending application 440 to the receiving application 450 is the sum of all of the object sending latency 460, the network latency 470, and the bounded latency 480.

The object sending latency 460, the network latency 470, and the bounded latency 480 may be variously set and managed. For example, when the application 440 sets a sending rate and an overall latency value through an API, the object sending latency 460 may be calculated using a sending rate and an object size, and the network latency 470 and the bounded latency 480 may be flexibly set and managed according to circumstances. In other words, when the network latency 470 increases due to a network problem, the bounded latency 480 may be reduced to satisfy latency required by the application 440. On the other hand, when the network latency 470 decreases, the bounded latency 480 may be increased.

In this example embodiment, it is assumed that a sending rate and the bounded latency 480 are shared between two nodes. However, the present disclosure is not limited thereto and may be applied to various circumstances as described in the above example.

Figure 5:
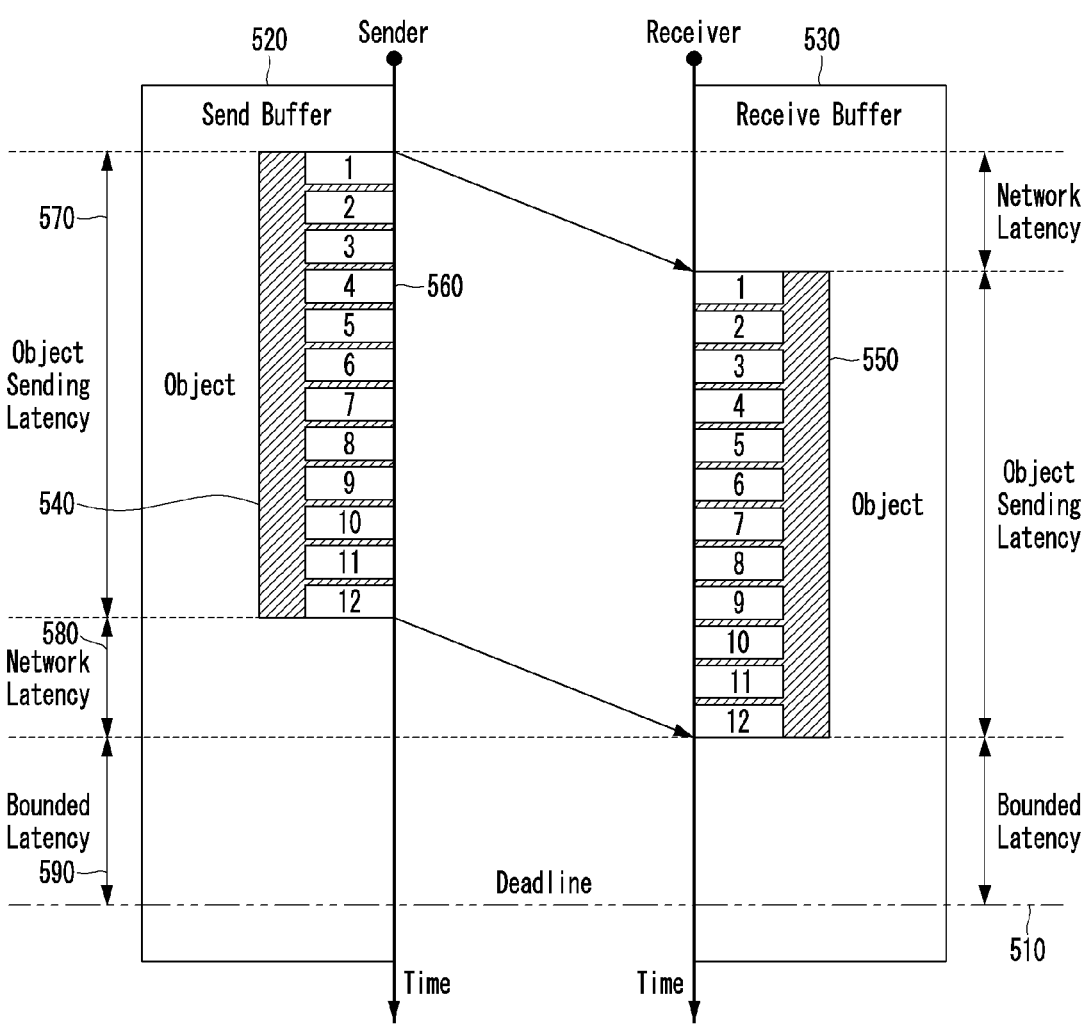
FIG. 5 is an example diagram illustrating a procedure for an object transmission apparatus to transmit an object and a latency required for transmitting the object.

FIG. 5 is an example diagram illustrating a procedure for an object transmission apparatus to transmit an object and a latency required for transmitting the object.

Referring to FIG. 5, an object 540 stored in a send buffer 520 of a sender includes a plurality of packets, for example, 12 packets 560, and is transmitted to a receive buffer 530 of a receiver. Here, each of time axes of the sender and receiver represents that the time passes as it goes down in FIG. 5.

More specifically, the send buffer 520 is a buffer that manages the object 540 to be transmitted from the sender to the receiver, and the receive buffer 530 is a buffer that manages the object 540 received from the sender.

An object 550 in the receive buffer 530 is obtained when the object 540 in the send buffer 520 is transmitted by the sender, received by the receiver, and put into the receive buffer 530. Each of the objects 540 and 550 includes at least one packet, and in this example embodiment, the 12 packets 560 are illustrated.

A time required for the send buffer 520 to transmit the entire object 540 out of the send buffer 520 or the sender may be referred to as an object sending latency 570, and a time required for the entire object 540 to be transmitted through a network may be referred to as a network latency 580. Also, a time required for the object 550 to wait in the receive buffer 530 before being transmitted to an application of the receiver may be referred to as a bounded latency 590.

In other words, a time required for transmitting the object 540 stored in the send buffer 520 from the send buffer 520 to the application of the receiver through the receive buffer 530 is the sum of all of the object sending latency 570, the network latency 580, and the bounded latency 590. In other words, the object 540 transmitted from the sender is only transmitted to the receiving application by a deadline 510. When all the packets 560 constituting the object 550 do not arrive at the receive buffer 520 by the deadline 510, the object 550 may be discarded without being transmitted to the application of the receiver.

Meanwhile, when it is determined that the object 540 is not transmitted to the receiver by the deadline 510, the sender may discard the object 540 and notify the receiver of the discard. Also, when it is determined that the object 550 is not received by the deadline 510, the receiver may discard the object 550 and notify the sender not to transmit the object 540 anymore.

The concept of determining whether an object can be transmitted or received on the basis of the deadline 510 and determining whether to transmit or receive the object may also be used for retransmitting the object.

To use the concept of a deadline on a sender side and a receiver side, both the sender side and the receiver side are required to calculate a deadline. For example, to calculate a deadline, the sender side and the receiver side may calculate the object sending latency 570 using the size of the object and a packet sending rate, acquire the network latency 580 from network delay information calculated when packets are consecutively transmitted and received, and manage the bounded latency 590 required for service characteristics by the receiving application.

Also, it is necessary to synchronize time between the sender and the receiver. Information on a bandwidth and the bounded latency 590 required for both the sender side and the receiver side may be shared by both sides through a control message. The sender may be referred to as an object transmission apparatus, and the receiver may be referred to as an object reception apparatus.

Figure 6:
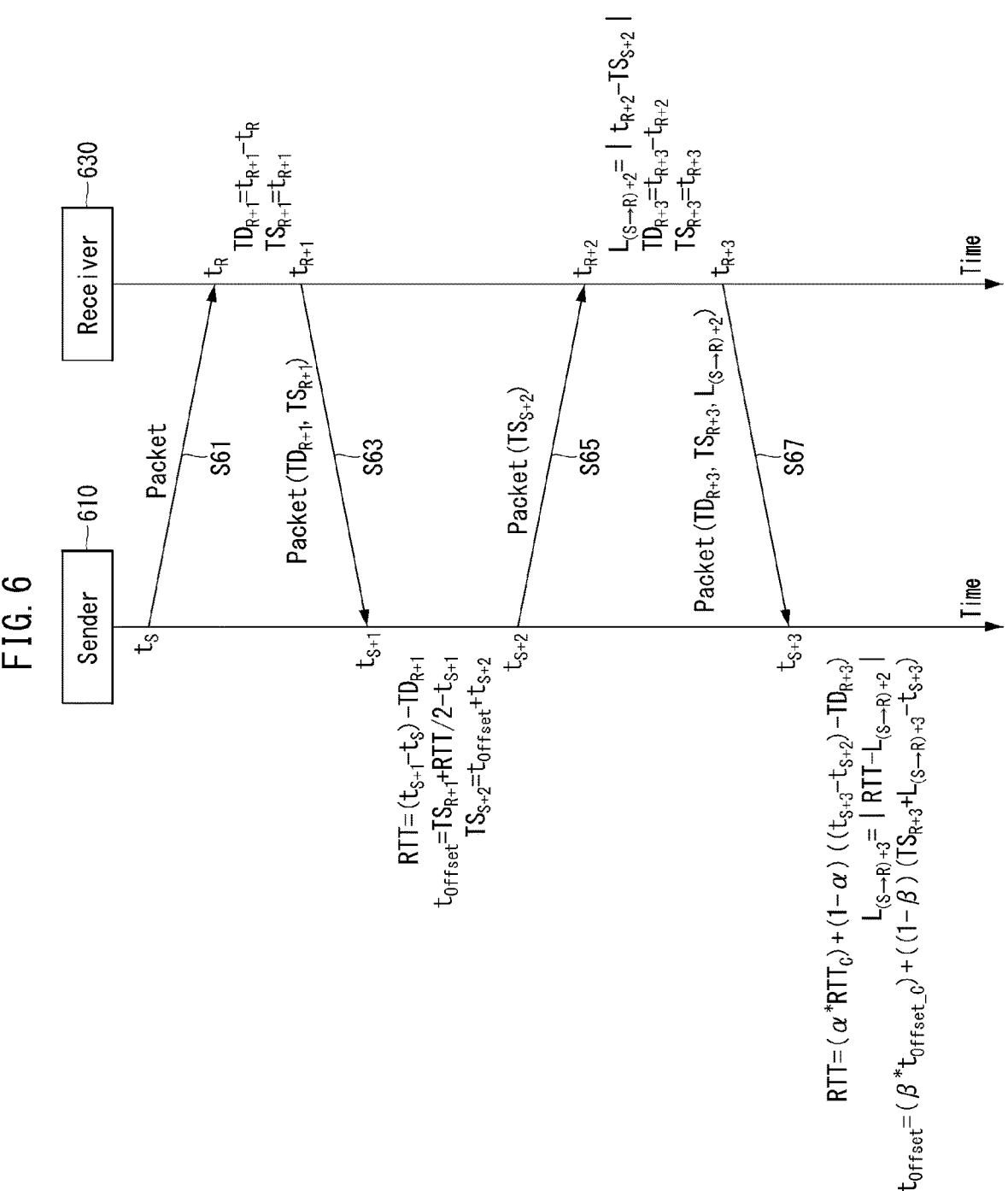
FIG. 6 is an example sequence diagram illustrating a process of synchronizing time between two communication nodes and calculating a network latency between the two communication nodes.

FIG. 6 is an example sequence diagram illustrating a process of synchronizing time between two communication nodes and calculating a network latency between the two communication nodes. The two communication nodes may include the object transmission apparatus and the object reception apparatus of FIG. 3 and may be referred to as a sender and a receiver.

Referring to FIG. 6, straight lines extending down from a sender 610 and a receiver 630 represent time axes, and $t_S$, $t_{S+1}$, $t_R$, $t_{R+1}$, and the like on the time axes are local times of the nodes.

First, the sender 610 transmits a first packet to a receiver 630 at a first time point $t_S$ (S61). The receiver 630 receives the first packet at a second time point $t_R$. The first packet may include information on the first time point $t_S$ which is a transmission time. The first packet may be used for calculating a round trip time (RTT) and a time difference between the two nodes.

The receiver 630 may calculate a first transmission delay time $TD_{R+1}$ representing the difference between a second time point $t_R$ at which the first packet is received and a third time point $t_{R+1}$ at which a second packet is transmitted. In other words, the receiver 630 may calculate a time required for transmitting the second packet which is a response packet to the sender 610 from the time at which the first packet is received.

Also, the receiver 630 may set a transmission time $TS_{R+1}$ of the second packet to be transmitted to the sender 610 as a third time point $t_{R+1}$. The transmission time $TS_{R+1}$ of the second packet becomes a local time of the receiver 630.

Subsequently, the receiver 630 transmits the second packet to the sender 610 at the third time point $t_{R+1}$ (S63). The sender 610 receives the second packet at a fourth time point $t_{S+1}$. The second packet may include information on the first transmission delay time $TD_{R+1}$ and the transmission time $TS_{R+1}$ of the second packet.

The sender 610 may calculate an RTT on the basis of the first time point $t_S$, the fourth time point $t_{S+1}$, and the first transmission delay time $TD_{R+1}$. The sender 610 may calculate a time difference $t_{offset}$ between transmission of the first packet and reception of the second packet on the basis of transmission time $TS_{R+1}$ of the second packet, the RTT, and the fourth time point $t_{S+1}$. In other words, the time difference between the two nodes may be calculated.

Also, the sender 610 may calculate a synchronized transmission time $TS_{S+2}$ of a fifth packet by adding the time difference $t_{offset}$ to a fifth time point $T_{S+2}$ at which the fifth packet will be transmitted. In other words, the sender 610 may correct a local time of the sender side into a local time of the receiver side. In other words, the sender 610 may synchronize time between the two nodes by adding the time difference between the two nodes to the local time of the sender. Since the local time of a sender side is synchronized with the local time of a receiver side in this example embodiment, the local time of the receiver side can be used on the receiver side without any change.

Subsequently, the sender 610 transmits a third packet to the receiver 630 at the fifth time point $T_{S+2}$ (S65). The receiver 630 may receive the third packet at a sixth time point $t_{R+2}$. The third packet may include the synchronized transmission time $TS_{S+2}$. The third packet is a packet exchanged to calculate the RTT and the time difference. The third packet may be periodically transmitted, and thus the RTT and the time difference between the two nodes can be continuously corrected.

The receiver 630 may calculate a network latency $L_{(S→R)+2}$ required for a packet transmitted from the sender side to arrive at the receiver side. In other words, since a value of the synchronized transmission time $TS_{S+2}$ transmitted from the sender side is corrected according to the local time of the receiver side, the receiver 630 may calculate the network latency by subtracting the time $TS_{S+2}$ at which the sender side transmits the third packet from the sixth time point $t_{R+2}$ at which the third packet is received.

Also, the receiver 630 may calculate a time $TD_{R+3}$ required for processing the third packet and transmitting a fourth packet which is a response packet to the third packet. The delay time $TD_{R+3}$ may be calculated by subtracting the sixth time point $t_{R+2}$ at which the third packet is received from a seventh time point $t_{R+3}$ at which the fourth packet is transmitted. The seventh time point $t_{R+3}$ may be set as a time $TS_{R+3}$ at which the fourth packet is transmitted.

Subsequently, the receiver 630 transmits the fourth packet to the sender 610 at the seventh time point $t_{R+3}$ (S67). The sender 610 receives the fourth packet at an eighth time point $t_{S+3}$. The fourth packet may be a response to the third packet. The fourth packet may include information on the transmission time $TS_{R+3}$ and the network latency $L_{(S\to R)+2}$.

The sender 610 may calculate an RTT value from the third packet and the fourth packet. $RTT_C$ used in calculating the RTT value represents a currently calculated RTT value, and α is a weight for determining a ratio of the $RTT_C$ value to be reflected in a newly calculated RTT value and has a range of $0\le\alpha\le1$.

Also, the sender 610 may calculate the network latency $L_{(R\to S)+3}$ occurring when the receiver side transmits a packet to the sender side. Network latencies such as the two network latencies $L_{(S\to R)+2}$ and $L_{(R\to S)+3}$ are calculated for different directions to prevent errors that may occur when direction-specific network latencies are different.

Further, the sender 610 may calculate the time difference $t_{offset}$ between the two nodes. In the calculation of the time difference $t_{offset}$, $t_{offset\_C}$ represents a currently calculated time difference, and a weight R is used for the same reason as the weight α used in the RTT calculation formula and has a range of $0\le\beta\le1$.

According to this example embodiment, it is possible to synchronize time between two nodes and calculate network latencies occurring in different directions by calculating a time difference between the two nodes.

Figure 7:
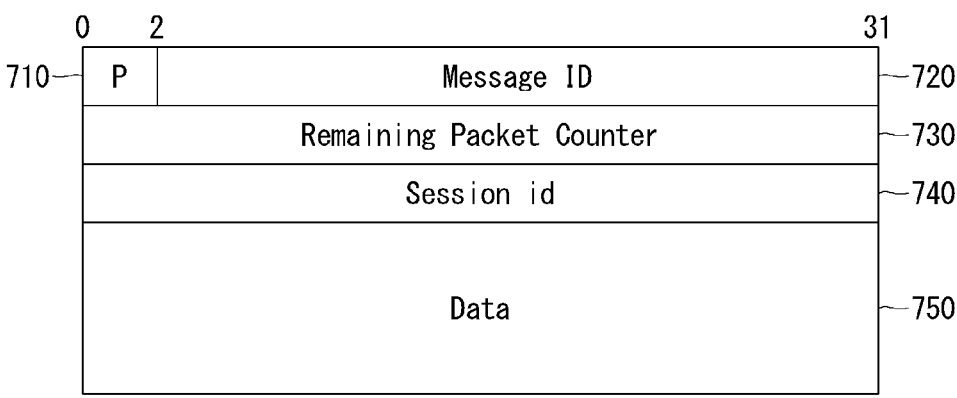
FIG. 7 is an example diagram illustrating a data packet structure that may be employed in data transmission and reception between two communication nodes.

FIG. 7 is an example diagram illustrating a data packet structure that may be employed in data transmission and reception between two communication nodes.

Referring to FIG. 7, the data packet structure may include a partition (P) field 710, an object identifier (ID) field 720, a remaining packet counter field 730, a session id field 740, and a data field 750.

The partition field 710 is configured to represent whether a corresponding packet is a first part, an intermediate part, or a last part of an object or whether the corresponding single packet is the object. An example of use of the partition field 710 is shown in Table 1 below.

TABLE 1

|  | Partition | | | |
| --- | --- | --- | --- | --- |
|  | First | Intermediate | Last | Single packet |
| Value | 00 | 01 | 10 | 11 |

The object ID field 720 contains an ID value for classifying a message which is a unique value in a specific connection.

The remaining packet counter field 730 contains the number of packets remaining after a currently transmitted packet. For example, in the case of transmitting the first packet among 10 packets included in one object, the partition field 710 has a value of "00," and the remaining packet counter field 730 has a value of "9." In the case of transmitting the second packet, the partition field 710 has a value of "01," and the remaining packet counter field 730 has a value of "8." In the case of finally transmitting the $10^{th}$ packet, the partition field 710 has a value of "10," and the remaining packet counter field 730 has a value of "0."

The receiver may be aware of the size of an object from the value of the remaining packet counter field 730 and calculate a deadline.

The object ID field 720 and the remaining packet counter field 730 may be used for determining whether a packet is lost and ordering packets and thus may replace a sequence number in wide general use.

The session id field 740 is an ID value for identifying a session, and may be exchanged between the sending node and the receiving node in the session establishment stage.

Here, the sender may use a value which has been corrected into a local time of the receiver using a time difference between the two nodes, and the receiver may use its local time without any change. The value may include information related to a time point at which the corresponding packet is transmitted, such as a timestamp.

The data field 750 contains data actually transmitted by a sending application.

The fields included in the data packet structure according to this example embodiment show minimum information, that is, necessary information, required for performing a data transmission method based on deadline recognition.

Figure 8:
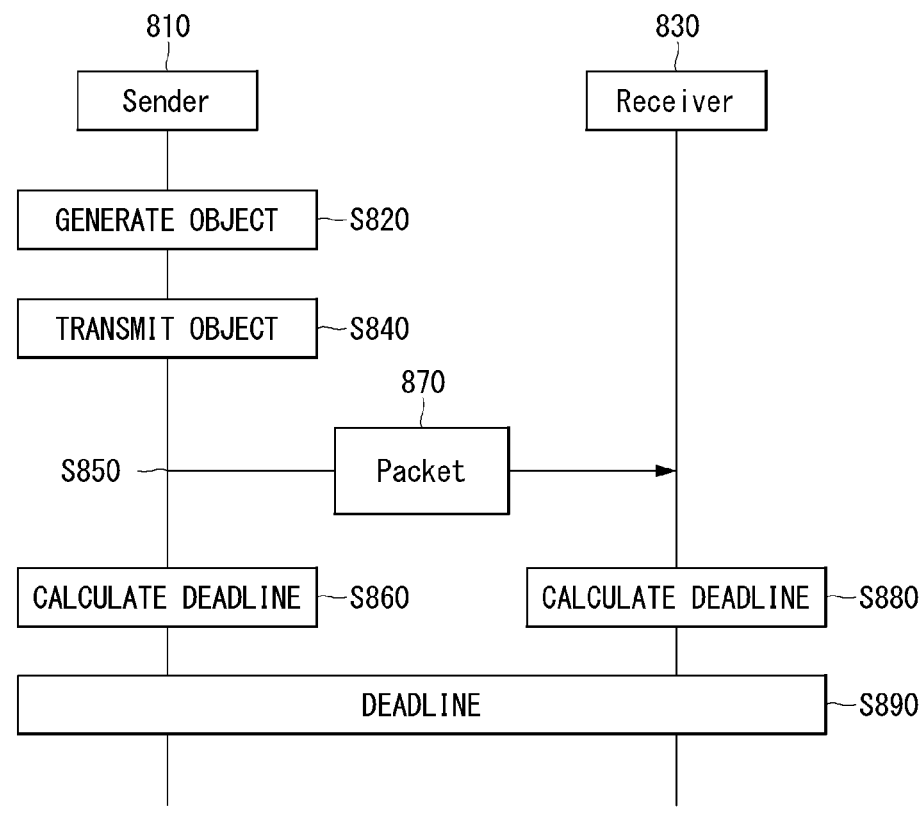
FIG. 8 is a sequence diagram illustrating a process in which each communication node calculates a deadline for data transmission or retransmission.

FIG. 8 is a sequence diagram illustrating a process in which each communication node calculates a deadline for data transmission or retransmission.

Referring to FIG. 8, it is assumed that a sender 810 and a receiver 830 may share necessary information through a control message. The necessary information may include a sending rate, a bandwidth, and a bounded latency. The sending rate may be 1 Gbps. It is assumed that, as a network latency, the two nodes have a value calculated through the network latency calculation procedure described above with reference to FIG. 6. As the network latency, the two nodes may maintain different values according to directions.

However, like an RTT value and a time difference $t_{offset}$ between the two nodes, a transitorily unstable network latency may be corrected by reflecting a previous network latency value.

First, the sender 810 may generate an object to be transmitted (S820). The generated object may have a size of 10 megabits, and each packet of the object may be transmitted in units of 1,250 bytes (10,000 bits).

Subsequently, the sender 810 may transmit the object to the receiver 830 (S840). Transmission of the object may be started at a specific time point (first time point) (S850). At least one data packet constituting the object may have the structure described above with reference to FIG. 7.

For example, a data packet 870 may have a partition field value of "00" representing the first packet of the object, a message ID, a remaining packet counter field value of "999," a corrected local time of the sender 810, and 1,250-byte data in a data field.

When transmission of the object is started, the sender 810 may calculate a deadline for the transmission of the object (S860). To calculate the deadline, the sender 810 may calculate an object sending latency. For example, the sender 810 may calculate that it takes 10 ms to transmit an entire object of 10 megabits at a sending rate of 1 Gbps.

Meanwhile, the receiver 830 may calculate a deadline for the reception of the object (S880). To this end, the receiver 830 may calculate the size of the object through the packet received on the receiver side. For example, the receiver 830 may be aware that the object includes 1,000 packets in total and each packet has 1,250 bytes from the value of "00" in the partition field, the value of "999" in the remaining packet counter field, and the data size of the data field.

Although the last packet of the object may have a different size, this has a very minor influence and thus may be ignored. When the size of the object is calculated, the receiver side also may calculate an object sending latency.

In addition, each of the two nodes may calculate a deadline (S890). In other words, a deadline may be calculated using an object sending latency value calculated at each node, a bounded latency value that each node already has, and a network latency value calculated at each node. In this example embodiment, a deadline is calculated on the assumption that network latencies calculated by the two nodes are the same.

The calculated deadline value may be used when the sender side transmits the object. In other words, the sender 810 may compare the sum of a sending latency of the already transmitted packet, a sending latency of a packet to be transmitted, the bounded latency, and the network latency with the previously calculated deadline to determine whether the object to be transmitted will be transmitted to the receiver side by the deadline. When it is determined that the object will not be transmitted by the deadline, the sender 810 may not transmit remaining packets of the object.

Similarly, the receiver 830 may compare the sum of the sending latency of the packet which has already been received on the receiver side, the sending latency of a packet to be received, the bounded latency, and the network latency with the previously calculated deadline to determine whether all the packets of the object will be received by the deadline. When it is determined that all the packets of the object will not be received by the deadline, the receiver 830 may request the sender side to stop the transmission of the object.

Also, when it is determined that the object does not arrive at the receiver side by the deadline, the receiver 830 may not simply discard the object but may make efforts to reduce the overall latency by scheduling the object with a higher priority or adjusting the quality of service (QoS) of the network.

Figure 9:
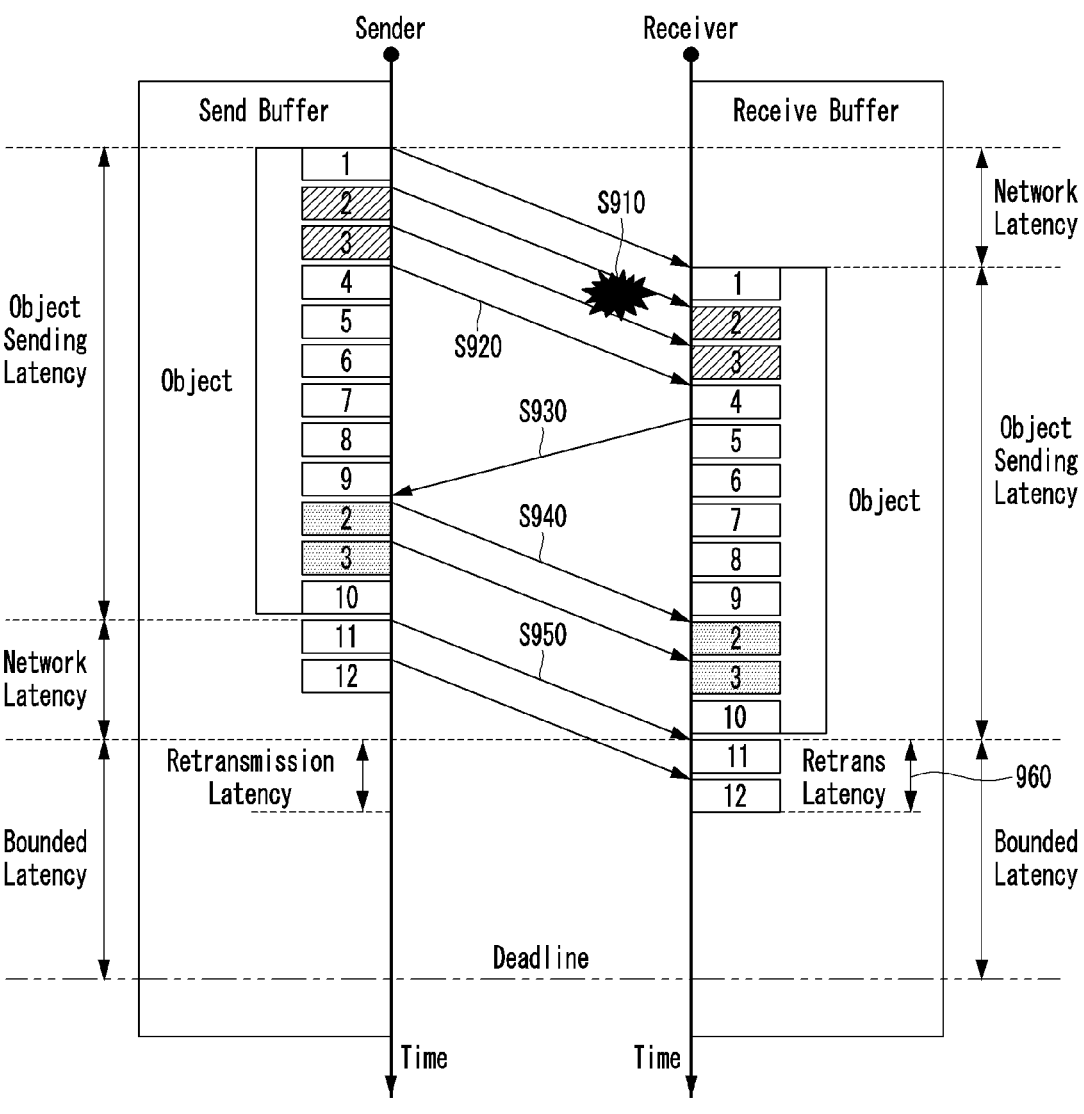
FIG. 9 is an example diagram illustrating a retransmission procedure of an object including 12 packets between two communication nodes.

FIG. 9 is an example diagram illustrating a retransmission procedure of an object including 12 packets between two communication nodes.

Referring to FIG. 9, when a sender transmits the object to a receiver, the second and third packets of the object do not arrive at the receiver side (S910), and the first and fourth packets arrive at the receiver side (S920). The object may be transmitted from a send buffer of the sender to a receive buffer of the receiver.

In the above case, the receiver may detect that the second and third packets are lost by receiving the fourth packet after the first packet and determine whether or not to proceed with retransmission. In other words, the receiver may retransmit the lost packets when the sum of a network latency from the sender side to the receiver side, an object sending latency required for transmitting all 12 packets, and a retransmission latency 960 required for retransmitting the two packets is within a precalculated deadline.

In other words, the receiver may transmit a negative-acknowledgment (NACK) packet to the sender to perform retransmission according to a result of determining whether or not to proceed with retransmission (S930). The NACK packet includes information on the non-received packets of the object.

When the NACK packet arrives at the sender side, the sender may already have transmitted up to the ninth packet. In this case, the sender node receiving the NACK packet may find that the second and third packets are lost and determine whether or not to proceed with retransmission again.

In other words, when the sum of a time period from a time point at which the first packet is transmitted to a time point at which the NACK packet is received, that is, a time period calculated by subtracting the time point at which the first packet is transmitted from the time point at which the NACK packet is received, a sending latency required for transmitting the packets to be retransmitted, a sending latency required for transmitting remaining packets, for example, the tenth, eleventh, and twelfth packets, and the network latency from the sender side to the receiver side is within the deadline, the sender may retransmit the second and third packets (S940).

Subsequently, the sender may transmit the remaining tenth, eleventh, and twelfth packets to the receiver (S950). At this time, compared to a case in which there is no retransmission procedure, there is an additional latency due to the retransmission, that is, the retransmission latency 960.

According to this example embodiment, the NACK message is transmitted from the receiver and arrives at the sender while the packets of the object are being transmitted. Accordingly, the retransmission latency 960 at the receiver may be equal to a retransmission latency which is required for retransmitting the two packets and calculated at the sender.

Figure 10:
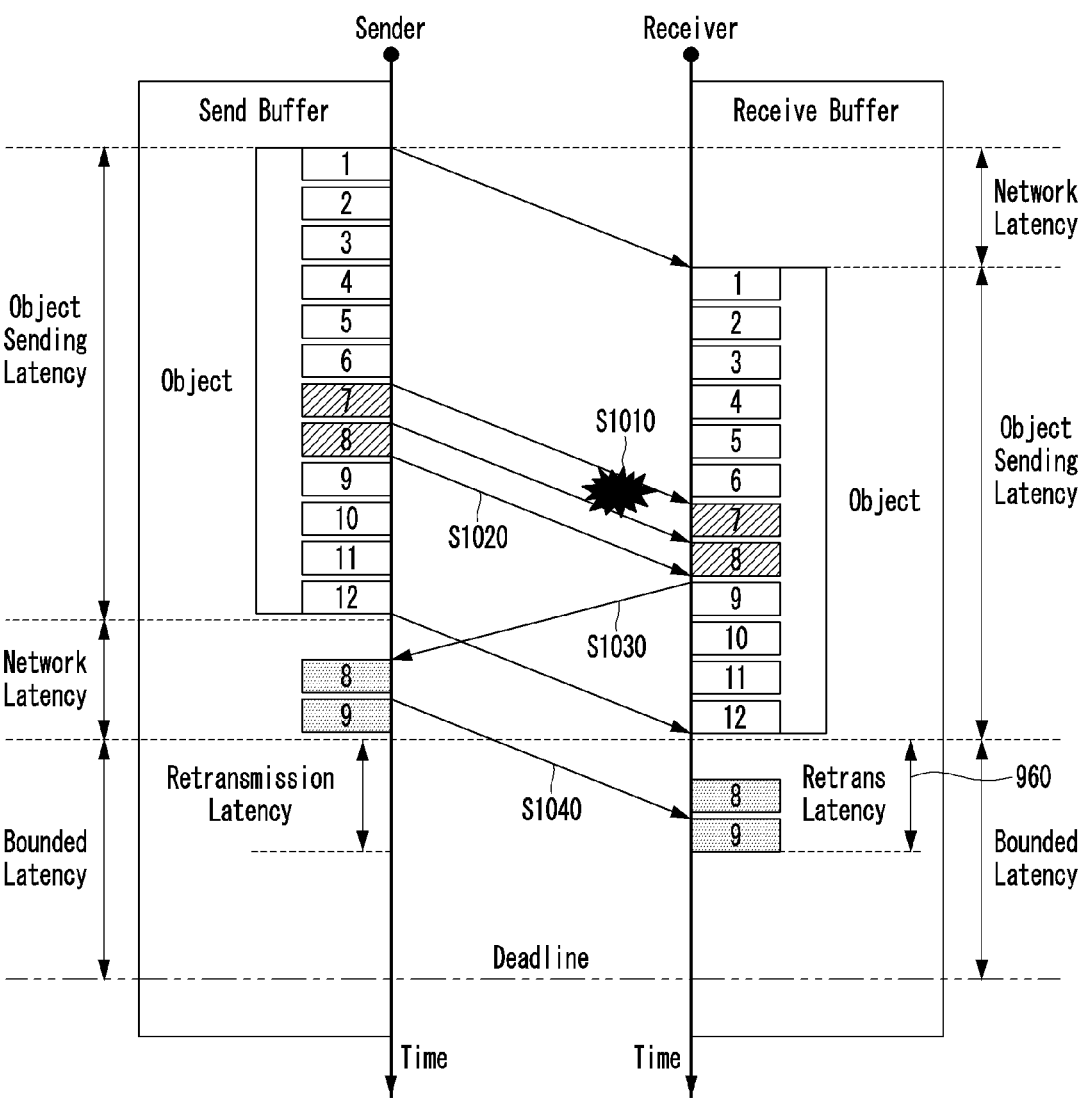
FIG. 10 is an example diagram illustrating another retransmission procedure of an object including 12 packets between two communication nodes.

FIG. 10 is an example diagram illustrating another retransmission procedure of an object including 12 packets between two communication nodes.

Referring to FIG. 10, when a sender transmits the object to a receiver, only the seventh and eighth packets of the object may not arrive at the receiver side (S1010), and the other packets may arrive at the receiver side (S1020). The object may be transmitted from a send buffer of the sender to a receive buffer of the receiver.

In the above case, the receiver receives the ninth packet after the sixth packet. Accordingly, the receiver detects that the seventh and eighth packets have not arrived and determines whether it is possible to retransmit the seventh and eighth packets. When it is possible to retransmit the seventh and eighth packets, the receiver transmits a NACK packet to the sender (S1030).

The sender receiving the NACK packet may determine whether or not to proceed with retransmission in the same way as described above with reference to FIG. 9. In other words, when the sum of a time period from a time point at which the first packet is transmitted to a time point at which the NACK packet is received, that is, a time period calculated by subtracting the time point at which the first packet is transmitted from the time point at which the NACK packet is received, a sending latency required for transmitting the packets to be retransmitted, an object sending latency (not in this example embodiment) required for transmitting packets of the object which are left without being transmitted yet, and a network latency from the sender side to the receiver side is within a precalculated deadline, the sender may retransmit the seventh and eighth packets (S1040).

The receiver node has an additional latency due to the retransmission, that is, a retransmission latency 960.

As described above, this example embodiment corresponds to a case in which the sender receives the NACK message from the receiver after transmitting all the packets including the seventh and eighth packets. In this case, there is not only the sending latency of the two retransmitted packets but also an additional latency corresponding to a time period from a time point at which the last twelfth packet is transmitted to a time point at which the NACK message is received.

In all the exemplary embodiments described above, two packets are retransmitted. Here, a retransmission latency for retransmitting two packets in FIG. 10 is higher than that in FIG. 9. This is because a retransmission latency varies depending on whether a NACK message is received while packets of an object are being transmitted or after all the packets of the objects are transmitted.

For this reason, in a particular case, it is difficult to accurately determine in a receiver side whether or not to proceed with retransmission. Accordingly, unless retransmission is completely impossible, the determination of whether retransmission is possible may be assigned to a sender side. The sender side is aware of an exact time point at which a NACK message is received, and thus can accurately determine whether or not to proceed with retransmission.

According to this example embodiment, the concept of a deadline is used for a sender side or a receiver side to determine whether all packets of an object may arrive at the receiver side. Therefore, when it is determined that the object cannot arrive at the receiver side by a deadline, transmission of the object is abandoned to prevent unnecessary data from being transmitted through a network, which reduces waste of resources of transmission and reception devices and the network.

According to the present disclosure, the concept of a deadline for a latency is employed. In the case of processing data in object units, each node calculates a deadline according to a calculation method defined for the deadline, and it is determined whether transmission, retransmission, reception, or re-reception of a data packet of an object is possible on the basis of the deadline. According to the determination, it is possible to perform or cancel transmission or retransmission of the data packet. Accordingly, waste of resources of transmission and reception devices and a network can be minimized. Also, a calculated deadline can be widely applied to various data processing fields such as data processing, scheduling, retransmission, and the like.

Further, in order to calculate a deadline, it is necessary to synchronize time between two nodes and measure a network latency between the two nodes. Accordingly, the present disclosure may include a procedure for synchronizing time between two nodes and also a procedure for measuring a network latency in each direction during the time synchronization process. Through these procedures, the present disclosure can be effectively used in various fields involving time synchronization such as the field of transmission protocols and the like.

In addition, according to the present disclosure, it is possible to provide an object retransmission technology to which the concept of a deadline is applied. In other words, an existing method of simply retransmitting a packet until a receiver side receives the packet is inappropriate for real-time services and increases network load in network congestion. Meanwhile, as an appropriate transmission and retransmission method for real-time services, the present disclosure makes it possible to calculate a deadline for a time required to transmit or retransmit an object in a communication environment, predict whether it is possible to transmit or receive the object normally, selectively process transmission, retransmission, or cancel of transmission of a packet constituting the object with high reliability on the basis of the prediction, and reduce waste of resources of transmission and reception devices and a network. A configuration of the present disclosure can be effectively used in various fields related to various selective retransmission methods.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for transmitting an object which is meaningful to an application, by a receiver, the method comprising:

calculating a network latency between a sender and the receiver through a control message for transmitting a plurality of packets which constituting the object, wherein the network latency is used for calculating a deadline determined for a transmission delay of the object;

detecting that a specific packet is lost among the plurality of packets;

calculating a retransmission required time required for retransmitting the specific packet;

comparing the retransmission required time with the deadline; and transmitting a negative-acknowledgment (NACK) message including information related to retransmission of the specific packet to the sender when the retransmission required time is within the deadline, the method further comprising:

recalculating, by the sender, the retransmission required time required for retransmitting the specific packet on the basis of a time period calculated by subtracting a time point at which a first packet of the object is transmitted from a time point at which the NACK message arrives; and determining, by the sender, whether the NACK message is received before or after a last packet of the object is transmitted, wherein, when the NACK message is received after the last packet of the object is transmitted to the receiver, the recalculating of the retransmission required time comprises additionally adding a time period calculated by subtracting a time point at which the last packet is transmitted from the time point at which the NACK message is received to the retransmission required time.

2. The method of claim 1, further comprising, when the recalculated retransmission required time is within the deadline, receiving the specific packet from the sender.

3. The method of claim 1, wherein each data packet structure of the plurality of packets includes a partition field which has a partition value indicating whether a corresponding packet is a first part, an intermediate part, or a last part of the object or whether the corresponding packet is the object.

4. The method of claim 3, wherein each data packet structure of the plurality of packets further includes a remaining packet counter field which indicates the number of packets remaining after a currently transmitted packet among the plurality of packets of the object.

5. The method of claim 1, further comprising sharing, by the receiver and the sender, information on a sending rate or a bandwidth and information on a bounded latency through a control message.

6. The method of claim 1, further comprising calculating the deadline by adding an object sending latency required for transmitting the plurality of packets, a bounded latency, and the network latency.

7. The method of claim 6, wherein, when the retransmission required time is within the deadline, a retransmission latency is smaller than the bounded latency.

8. The method of claim 1, further comprising:

calculating, by the sender, a first network latency occurring when the sender transmits a packet to the receiver; and calculating, by the sender, a second network latency occurring when the receiver transmits a packet to the sender.

9. A method for transmitting an object which is used in an application, by a sender, the method comprising:

calculating a network latency between the sender and a receiver through a control message for transmitting a plurality of packets constituting the object, wherein the network latency is used for calculating a deadline determined for a transmission delay of the object;

receiving a negative-acknowledgment (NACK) message from the receiver detecting that a specific packet is lost among the plurality of packets;

calculating a retransmission required time required for retransmitting the specific packet on the basis of a time period calculated by subtracting a time point at which a first packet of the object is transmitted from a time point at which the NACK message arrives; and retransmitting the specific packet to the sender when the calculated retransmission required time is within the deadline, the method further comprising determining whether the NACK message is received before or after a last packet of the object is transmitted, wherein, when the NACK message is received after the last packet of the object is transmitted to the receiver, the calculating of the retransmission required time comprises additionally adding a time period calculated by subtracting a time point at which the last packet is transmitted from the time point at which the NACK message is received to the retransmission required time.

10. The method of claim 9, further comprising calculating the deadline by adding an object sending latency required for transmitting the plurality of packets, a bounded latency, and the network latency.

11. The method of claim 10, wherein, when the retransmission required time is within the deadline, a retransmission latency is smaller than the bounded latency.

12. The method of claim 9, wherein each data packet structure of the plurality of packets includes a partition field which has a partition value indicating whether a corresponding packet is a first part, an intermediate part, or a last part of the object or whether the corresponding packet is the object.

13. The method of claim 12, wherein each data packet structure of the plurality of packets further includes a remaining packet counter field which indicates the number of packets remaining after a currently transmitted packet among the plurality of packets of the object.

14. The method of claim 9, wherein the receiver calculates a retransmission required time required for retransmitting the specific packet, comparing the retransmission required time with a precalculated deadline, and transmitting a NACK message including information related to retransmission of the specific packet to the sender when the retransmission required time is within the deadline.

* * * * *